US012641651B2

(12) United States Patent
Chun

(10) Patent No.: US 12,641,651 B2
(45) Date of Patent: May 26, 2026

(54) METHOD AND APPARATUS FOR DETECTING PHYSICAL RANDOM ACCESS CHANNEL IN COMMUNICATION SYSTEM

(71) Applicant: ELECTRONICS AND TELECOMMUNICATIONS RESEARCH INSTITUTE, Daejeon (KR)

(72) Inventor: Ik Jae Chun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 398 days.

(21) Appl. No.: 18/501,266

(22) Filed: Nov. 3, 2023

(65) Prior Publication Data

US 2024/0155694 A1     May 9, 2024

(30) Foreign Application Priority Data

Nov. 4, 2022     (KR) ......................... 10-2022-0146193
Oct. 26, 2023     (KR) ......................... 10-2023-0144705

(51) Int. Cl.
*H04W 74/0833* (2024.01)
*H04W 72/0453* (2023.01)
*H04W 74/00* (2009.01)

(52) U.S. Cl.
CPC ... *H04W 74/0833* (2013.01); *H04W 72/0453* (2013.01); *H04W 74/002* (2013.01)

(58) Field of Classification Search
CPC ......... H04W 74/0833; H04W 72/0453; H04W 74/002; H04L 5/0048; H04L 27/2692
See application file for complete search history.

(56) References Cited

U.S. PATENT DOCUMENTS

| | | | |
|---|---|---|---|
| 9,717,100 B2 | 7/2017 | Mraraghavan | |
| 2013/0215856 A1 | 8/2013 | Joung et al. | |
| 2014/0211677 A1 | 7/2014 | Barbieri et al. | |
| 2016/0270058 A1* | 9/2016 | Furuskog | H04L 1/0006 |
| 2018/0220466 A1 | 8/2018 | Park et al. | |
| 2021/0051731 A1 | 2/2021 | Lee et al. | |
| 2021/0184795 A1 | 6/2021 | Casas et al. | |
| 2022/0086774 A1 | 3/2022 | Qian et al. | |
| 2022/0210845 A1 | 6/2022 | Ko | |
| 2022/0418003 A1 | 12/2022 | Park et al. | |
| 2023/0011025 A1 | 1/2023 | Moon et al. | |

* cited by examiner

*Primary Examiner* — Thomas R Cairns
*Assistant Examiner* — Raenita Ann Fenner
(74) *Attorney, Agent, or Firm* — Rabin & Berdo, P.C.

(57)     ABSTRACT

A method of a communication node may comprise: assigning preambles to a plurality of FDOs, respectively; generating reconfiguration information including information on the preambles assigned to each of the plurality of FDOs; assigning a PDU to each preamble among the assigned preambles based on the reconfiguration information; generating a reference sequence for each of the assigned preambles based on information on the preambles assigned to each of the plurality of FDOs; generating matching information between each preamble index of the preambles assigned to each of the plurality of FDOs and a PDU index of a PDU assigned to each preamble corresponding to each preamble index, based on the reconfiguration information; and detecting a preamble assigned to each PDU from an FFT signal using the reference sequence and each PDU according to the matching information.

10 Claims, 13 Drawing Sheets

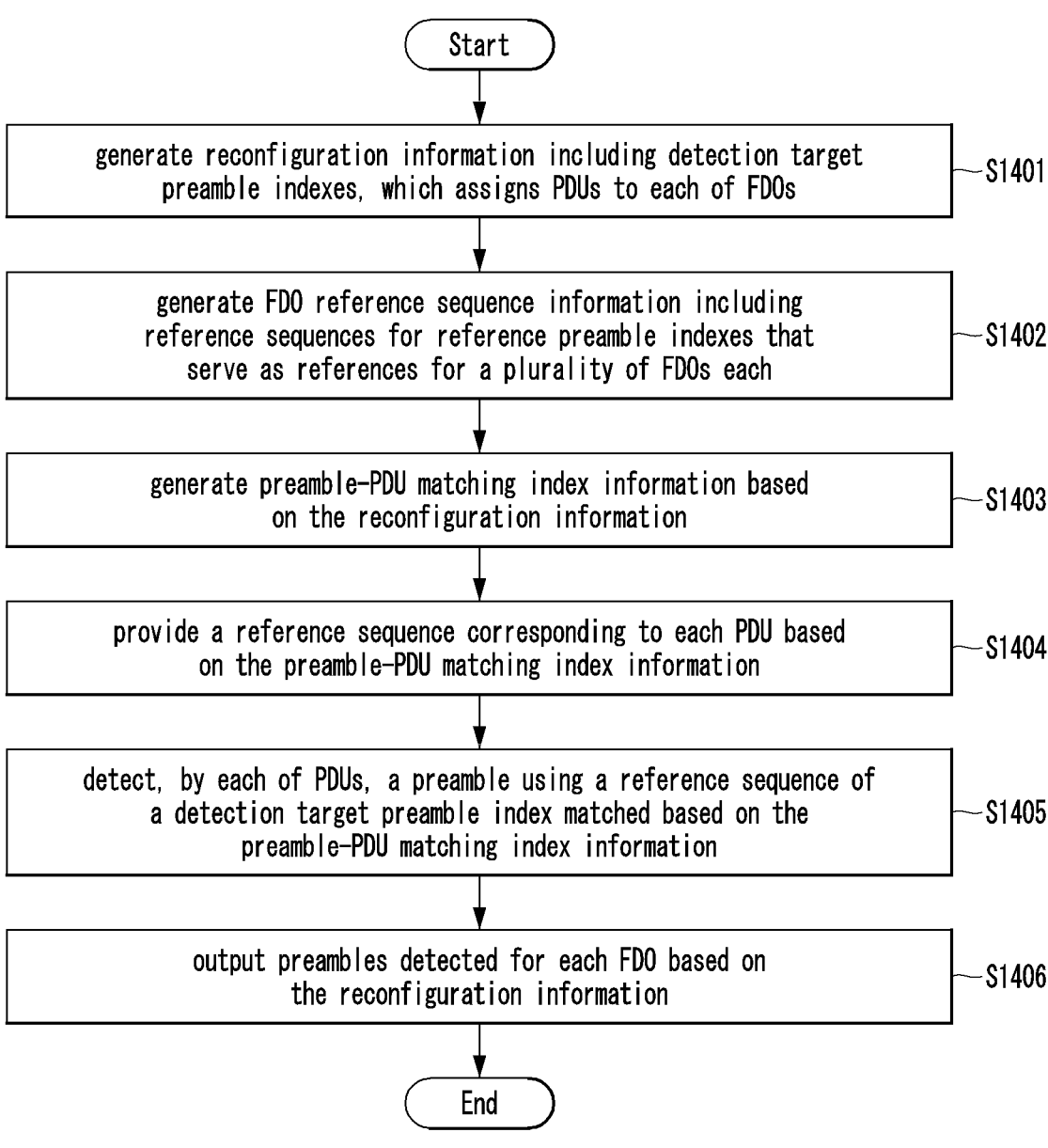

Start generate reconfiguration information including detection target preamble indexes, which assigns PDUs to each of FDOs ~S1401 generate FDO reference sequence information including reference sequences for reference preamble indexes that serve as references for a plurality of FDOs each ~S1402 generate preamble-PDU matching index information based on the reconfiguration information ~S1403 provide a reference sequence corresponding to each PDU based on the preamble-PDU matching index information ~S1404 detect, by each of PDUs, a preamble using a reference sequence of a detection target preamble index matched based on the preamble-PDU matching index information ~S1405 output preambles detected for each FDO based on the reconfiguration information ~S1406

End

METHOD AND APPARATUS FOR DETECTING PHYSICAL RANDOM ACCESS CHANNEL IN COMMUNICATION SYSTEM

CROSS-REFERENCE TO RELATED APPLICATIONS

This application claims priority to Korean Patent Applications No. 10-2022-0146193, filed on Nov. 4, 2022, and No. 10-2023-0144705, filed on Oct. 26, 2023, with the Korean Intellectual Property Office (KIPO), the entire contents of which are hereby incorporated by reference.

BACKGROUND

1. Technical Field

Exemplary embodiments of the present disclosure relate to a technique for detecting a physical random access channel (PRACH) in a communication system, and more specifically, to a technique for detecting a PRACH in a communication system, which detects a PRACH by reconfiguring PRACH detection units according to reconfiguration information.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, a random access method in the communication system may be classified into two types: a contention-based scheme and a contention-free scheme. In both types, as a first step of a random access process, a terminal may transmit a preamble to a base station through a PRACH. Then, the base station may detect the preamble by processing the PRACH. For this purpose, the base station may use a PRACH detector.

For example, in the case of 5G NR, the PRACH detector may use up to 8 frequency domain occasions (FDOs), and may be configured to recognize up to 64 preamble sequences in each FDO. When a system is required selectively to detect 16 preambles for each FDO using 4 FDOs or to detect 8 preambles using 8 FDOs, the PRACH detector may be implemented to process 8 FDOs and detect 16 preambles for each FDO. However, the PRACH detector implemented based on the above-described performance requirements cannot be used for a system that should process 32 preambles for each FDO by using 2 FDOs. Therefore, a redesign of the system through a change in structure may be required to apply the PRACH detector implemented based on the above-described performance requirements to the system that should process 32 preambles for each FDO by using 2 FDOs.

SUMMARY

Exemplary embodiments of the present disclosure are directed to providing a method and an apparatus for detecting a PRACH, that configure a set of PRACH detection units and reconfigure grouping of the PRACH detection units according to reconfiguration information to improve usability even when a technical specification related to random access channel detection is changed after implementation of a communication system.

According to a first exemplary embodiment of the present disclosure, a method of a communication node may comprise: assigning preambles to a plurality of frequency domain occasions (FDOs), respectively; generating reconfiguration information including information on the preambles assigned to each of the plurality of FDOs; assigning a physical random access channel (PRACH) detection unit (PDU) to each preamble among the assigned preambles based on the reconfiguration information; generating a reference sequence for each of the assigned preambles based on information on the preambles assigned to each of the plurality of FDOs; generating matching information between each preamble index of the preambles assigned to each of the plurality of FDOs and a PDU index of a PDU assigned to each preamble corresponding to each preamble index, based on the reconfiguration information; and detecting a preamble assigned to each PDU from a fast Fourier transform (FFT) signal using the reference sequence and each PDU according to the matching information.

The reconfiguration information may include an FDO index for each FDO of the plurality of FDOs and preamble indexes of the preambles assigned to the each FDO.

The generating of the reference sequence may comprise: obtaining, from a distributed unit, radio resource control (RRC) parameters including information on the preambles assigned to each FDO; and generating the reference sequence for each of the assigned preambles based on the RRC parameters obtained from the DU.

The method may further comprise: generating reference sequence information including an FDO index for each FDO, a preamble index of each preamble of the assigned preambles, and the reference sequence for each preamble.

The generating of the matching information may comprise: identifying each preamble index of the preambles assigned to each FDO based on the reconfiguration information; identifying the PDU index of the PDU assigned to each preamble; and based on a result of identifying the each preamble index and the PDU index, generating matching information including an FDO index for each FDO, the each preamble index, and the PDU index of the PDU assigned to the each preamble.

The method may further comprise: receiving preambles selected from among preambles received from the terminals by using the reference sequences assigned to the PDU based on the reconfiguration information through the plurality of FDOs, wherein the FFT signal includes the preambles received through the plurality of FDOs.

According to a second exemplary embodiment of the present disclosure, a communication node may comprise: a processor; an interconnection controller; a reference sequence generator; a reconfiguration interconnection module; and physical random access channel (PRACH) detection units (PDUs), wherein the processor causes the communication node to perform: assigning preambles to a plurality of frequency domain occasions (FDOs), respectively; generating reconfiguration information including information on the preambles assigned to each of the plurality of FDOs; assigning a physical random access channel (PRACH) detection unit (PDU) to each preamble among the assigned preambles based on the reconfiguration information; generating a reference sequence for each of the assigned preambles based on information on the preambles assigned to each of the plurality of FDOs; generating matching information between each preamble index of the preambles assigned to each of the plurality of FDOs and a PDU index of a PDU assigned to each preamble corresponding to each preamble index, based on the reconfiguration information; and detecting a preamble assigned to each PDU from a fast Fourier transform (FFT) signal using the reference sequence and each PDU according to the matching information.

In the generating of the reference sequence, the processor may further cause the communication node to perform: obtaining, from a distributed unit, radio resource control (RRC) parameters including information on the preambles assigned to each FDO; and generating the reference sequence for each of the assigned preambles based on the RRC parameters obtained from the DU.

The processor may further cause the communication node to perform: generating reference sequence information including an FDO index for each FDO, a preamble index of each preamble of the assigned preambles, and the reference sequence for each preamble.

In the generating of the matching information, the processor further may cause the communication node to perform: identifying each preamble index of the preambles assigned to each FDO based on the reconfiguration information; identifying the PDU index of the PDU assigned to each preamble; and based on a result of identifying the each preamble index and the PDU index, generating matching information including an FDO index for each FDO, the each preamble index, and the PDU index of the PDU assigned to the each preamble.

The processor may further cause the communication node to perform: receiving preambles selected from among preambles received from the terminals by using the reference sequences assigned to the PDU based on the reconfiguration information through the plurality of FDOs, wherein the FFT signal includes the preambles received through the plurality of FDOs.

According to the present disclosure, a PRACH detector may have a reconfigurable structure. In addition, according to the present disclosure, the PRACH detector can provide flexibility according to a change in system performance in an environment where a functional split scheme using radio units and distributed units is considered according to a functional split option of 5G or NR, and can operate at low power. Further, according to the present disclosure, the PRACH detector can be reconfigured and used based on a system situation according to users' required performances, thereby reducing unnecessary wastes in the system and increasing the usability of the system.

BRIEF DESCRIPTION OF DRAWINGS

FIG. 4 is a conceptual diagram illustrating a first exemplary embodiment of a PRACH detection method using a PRACH detection apparatus.

FIG. 5 is a conceptual diagram illustrating a second exemplary embodiment of a PRACH detection method using a PRACH detection apparatus.

FIG. 14 is a flowchart illustrating a first exemplary embodiment of a PRACH detection method in a communication system.

DETAILED DESCRIPTION OF THE EMBODIMENTS

Figure 1:
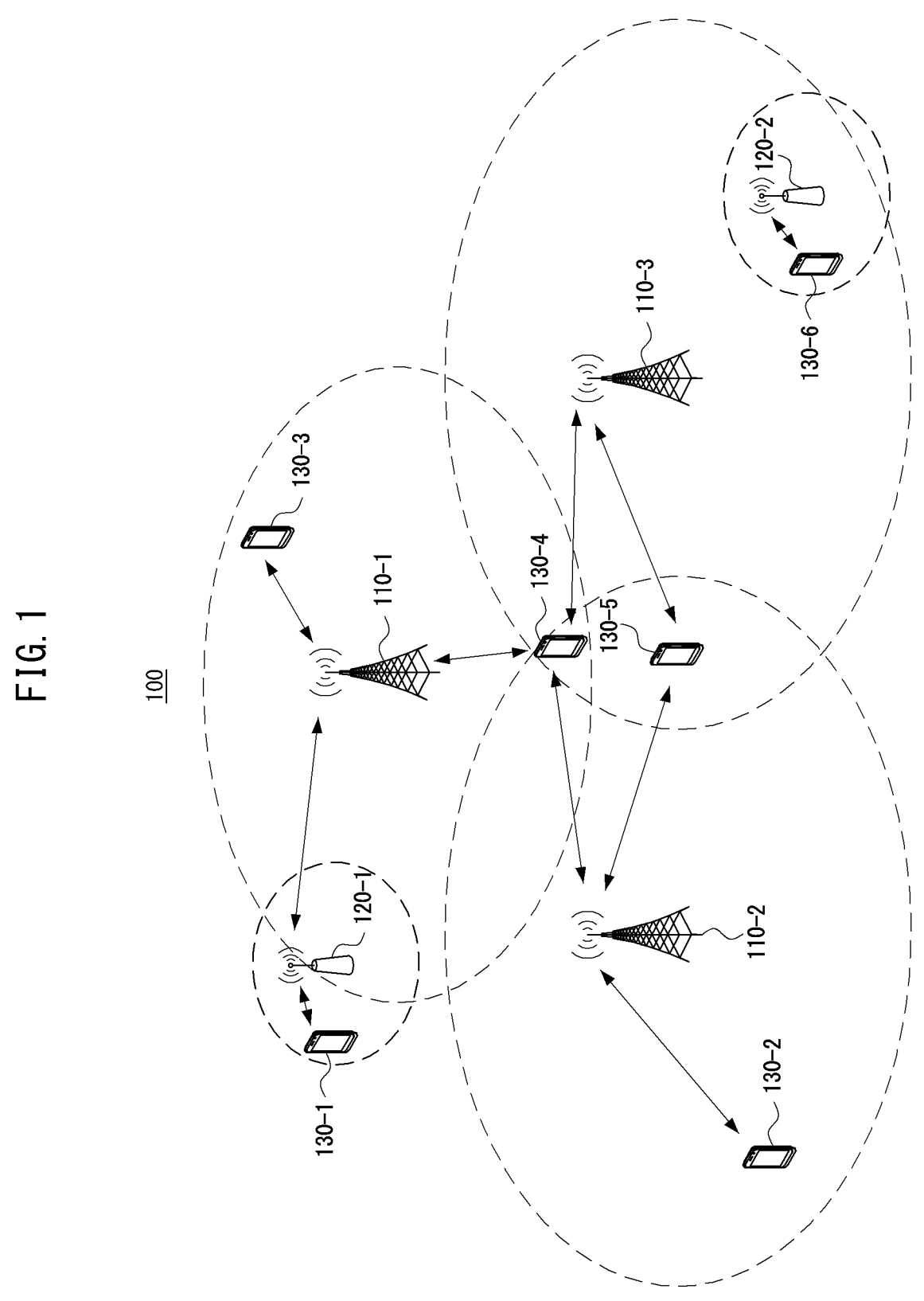
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the FIGS. and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
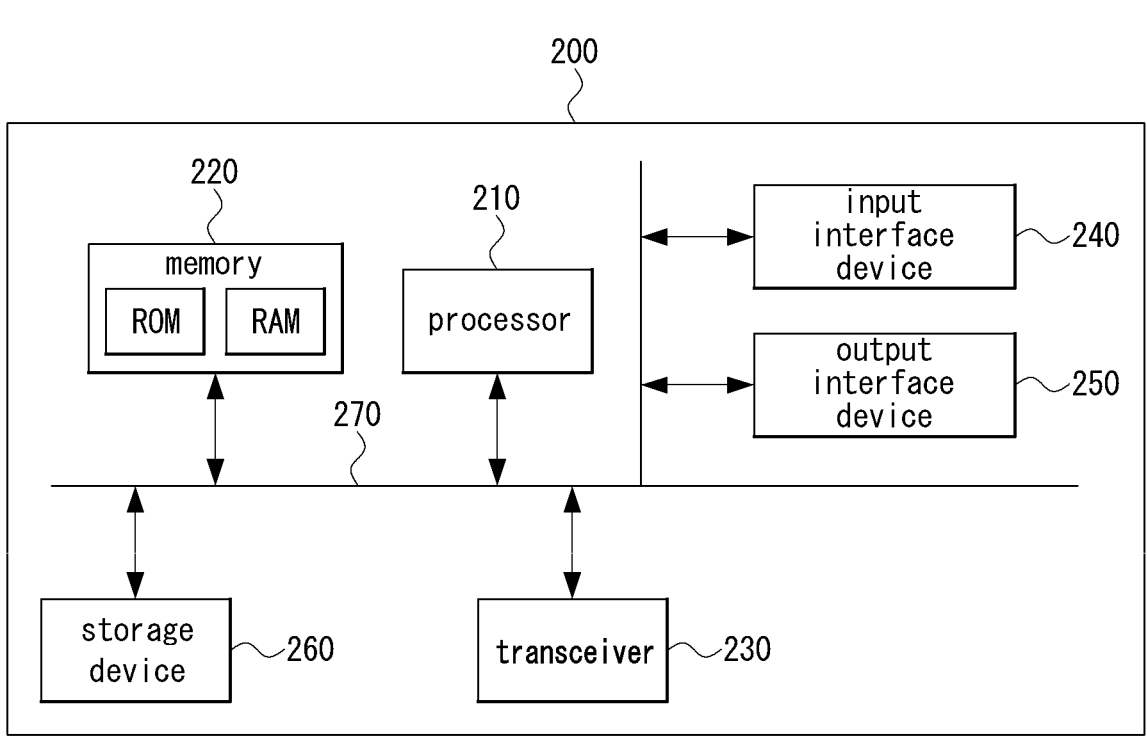
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, the LTE may be a basic service for wireless communication. Accordingly, service providers may need to provide fast setup and switchover times due to various new applications based on the LTE and subscribers' high data usage. The various new applications and subscribers' high data usage also cause the service providers to meet customer demands for high capacity and always-on connectivity. To this end, the service providers are accelerating research and development of new hardware and software for radio access network (RAN) upgrades, spectrum reconfiguration, and licensed-unlicensed multi-mode.

Furthermore, the service providers may need a software-controlled RAN using dedicated hardware that can be applied in a variety of ways. To meet such the requirements, a 5G topology has introduced a new scheme to create and define a multi-segment architecture. The $3^{rd}$ generation partnership project (3GPP) release 15 has defined a flexible architecture for 5G RAN. In addition, the 3GPP release 15 splits a base station (i.e., gNodeB (gNB)) into three logical nodes: a centralized unit (CU), a distributed unit (DU), and a radio unit (RU).

In this regard, the open radio access network (O-RAN) alliance supports a functional split option 7.2 for networks requiring high capacity and high reliability. The functional split scheme can facilitate simplified radio units that can be shared by multiple operators and have size and power consumption advantages in forming a high-density network. Through this, the independence of hosts and radio units can be guaranteed. In addition, functionality of an enhanced common public radio interface (eCPRI) running on Ethernet can provide significant benefits in urban areas and indoor environments such as factories and office blocks requiring a 5G coverage.

Accordingly, the present disclosure is directed to providing a reconfigurable PRACH detector with a reconfigurable structure. This type of reconfigurable PRACH detector may operate at low power while providing flexibility for a varying system performance in an environment where the functional split scheme using radio units and distributed units is considered according to the function split option of 5G or NR. Further, according to the present disclosure, the PRACH detector may be reconfigured and used based on a system situation according to user's required performances, thereby reducing unnecessary wastes in the system and increasing the usability of the system.

As an example, the PRACH detector may include a PRACH detection block configured independently for each frequency domain occasion (FDO) so as to simultaneously process PRACH preambles input on the same time axis (i.e., through the same time domain occasion (TDO)). In addition, the PRACH detection block may include as many preamble detectors as the number of detectable preambles for each FDO. Accordingly, each of the preamble detectors may independently and simultaneously detect a preamble.

For example, there may be 8 FDOs within one TDO. In this case, if 8 PRACH preambles need to be detected for each FDO, the PRACH detector may have 8 PRACH detection blocks. In addition, each PRACH detection block may include 8 independent preamble detectors to process 8 preambles simultaneously.

The PRACH detector may detect PRACHs in each FDO through an operation on values of reference sequences and fast Fourier transform (FFT) data received from an RU. The reference sequence may be a PRACH sequence corresponding to a preamble index of a preamble to be detected in the designated FDO, and may be a sequence obtained by allocating the PRACH sequence to a location of subcarriers (i.e., resource elements) of the corresponding FDO on the frequency axis.

The location of subcarriers for detecting PRACH preambles may vary depending on the location of the FDO. Therefore, reference sequences with the same preamble index may be different in different FDOs. Since operations are classified for each FDO as described above, a processing specification of the FDOs that can be processed may affect the structure of the system.

For example, in the case of 5G NR, the PRACH detector may use up to 8 frequency domain occasions (FDOs), and may be configured to recognize up to 64 preamble sequences in each FDO. When a system is required selectively to detect 16 preambles for each FDO using 4 FDOs or to detect 8 preambles using 8 FDOs, the PRACH detector may be implemented to process 8 FDOs and detect 16 preambles for each FDO. However, the PRACH detector implemented based on the above-described performance requirements cannot be used for a system that should process 32 preambles for each FDO by using 2 FDOs. Therefore, a redesign of the system through a change in structure may be required to apply the PRACH detector implemented based on the above-described performance requirements to the system that should process 32 preambles for each FDO by using 2 FDOs.

Figure 3:
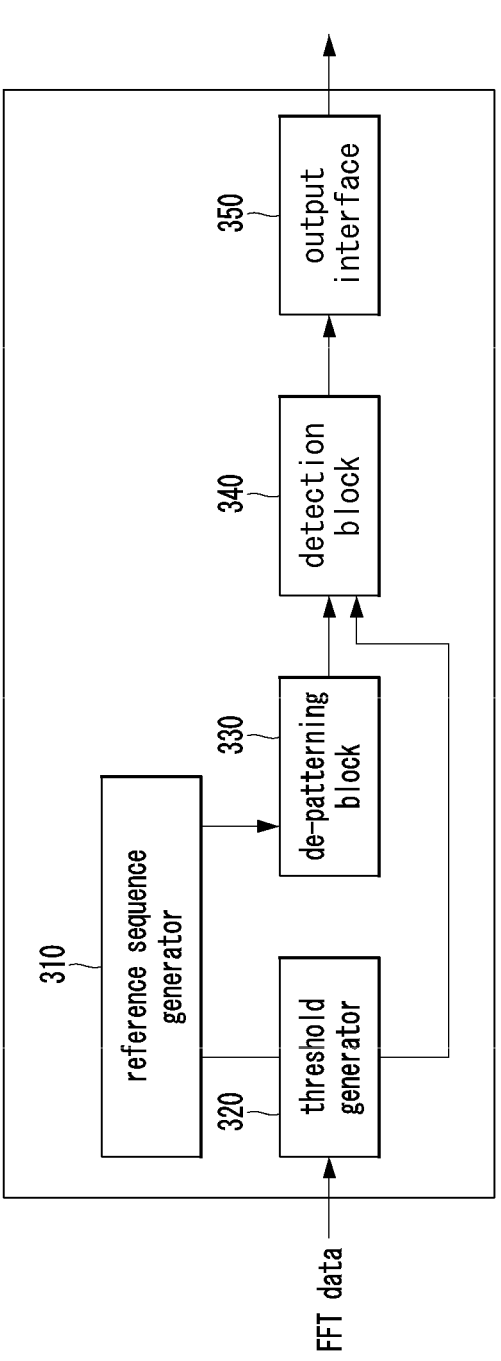
FIG. 3 is a block diagram illustrating a first exemplary embodiment of a PRACH detection apparatus in a communication system.

FIG. 3 is a block diagram illustrating a first exemplary embodiment of a PRACH detection apparatus in a communication system.

Referring to FIG. 3, a PRACH detection apparatus may include a reference sequence generator 310, a threshold generator 320, a de-patterning block 330, a detection block 340, and an output interface 350. Here, the reference sequence generator 310 may generate a reference sequence corresponding to a preamble index of a preamble to be detected according to a PRACH occasion on the frequency axis. The reference sequence generator 310 may provide the generated reference sequence to the threshold generator 320 and the de-patterning block 330. Accordingly, the threshold generator 320 may receive the reference sequence from the reference sequence generator 310 and receive FFT data from an RU. In addition, the threshold generator 320 may generate a threshold with reference to the received reference sequence, and provide the generated threshold to the detection block 340.

Meanwhile, the de-patterning block 330 may receive the reference sequence from the reference sequence generator 310 and receive the FFT data from the RU. Then, the de-patterning block 330 may perform element-wise conjugate product, inverse fast Fourier transform (IFFT), and combining using the received reference sequence and FFT data.

That is, the de-patterning block 330 may match the reference sequence of the preamble index to be detected with the FFT data input from the RU. In addition, the de-patterning block 330 may generate time shift information indicating a degree of a time-axis shift of the FFT data of the RU compared to the reference sequence corresponding to the preamble index. Here, the FFT data of the RU and the values of the reference sequence corresponding to the preamble index to be detected may match. In this case, a result of performing IFFT on a conjugate product between the two data may have a peak value at 0 on the time axis. When the FFT data of the RU, which is shifted on the time axis, is matched with the values of the reference sequence, an output of performing IFFT on a conjugate product between the two data may have a peak value at the time-shifted location of an input waveform of the RU. The de-patterning block 330 may iteratively perform the above-described process on received PRACH symbols and combine values therefrom. Then, the de-patterning block 330 may provide a result of the combining to the detection block 340.

Accordingly, the detection block 340 may receive the threshold from the threshold generator 320, and receive the output of the de-patterning block 330. In addition, the detection block 340 may check whether the output of the de-patterning block 330 is greater than the threshold. In addition, the detection block 340 may use the results to output a finally detected preamble index and an offset value therefor on the time axis.

In addition, the detection block 340 may output number(s) indicating slot(s), symbol(s), frame(s), FDO(s), and the like where the detection has been performed. The detection block 340 may perform the above-described processes in parallel for reference sequences to be detected for each FDO. The PRACH detection apparatus may perform the above-described role in a high physical layer for a DU of the functional split option 7-2, and may detect one preamble. The PRACH detection apparatus may detect and output the preamble index and a timing advance (TA) therefor from the FFT data received from the RU.

Figure 4:
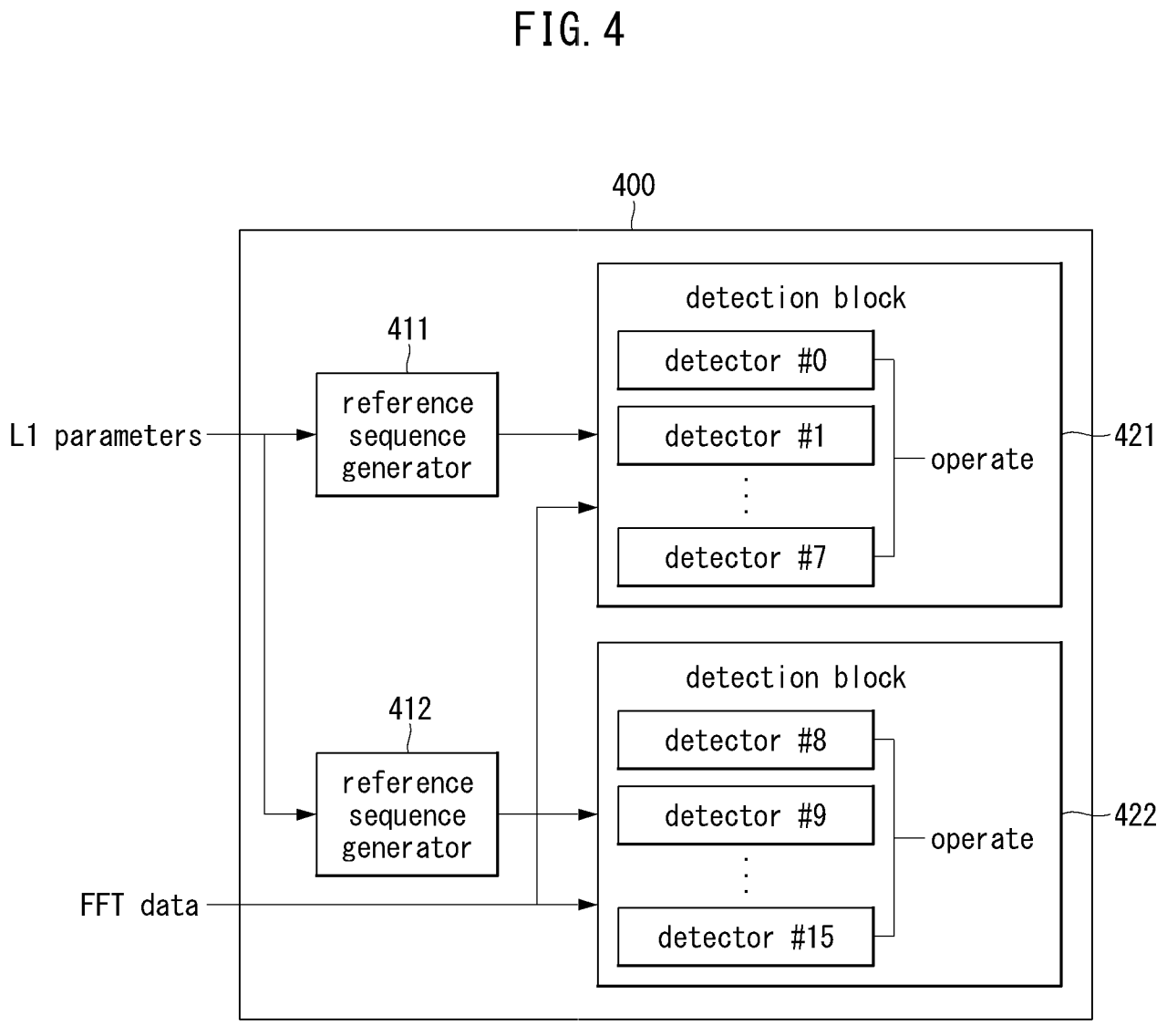

FIG. 4 is a conceptual diagram illustrating a first exemplary embodiment of a PRACH detection method using a PRACH detection apparatus.

Referring to FIG. 4, a PRACH detection apparatus 400 may include two reference sequence generators 411 and 412 and two detection blocks 421 and 422. Here, the first reference sequence generator 411 may receive layer 1 (L1) parameters from an RU, generate reference sequences for a first FDO, and output them to the first detection block 421. In addition, the second reference sequence generator 412 may receive L1 parameters from the RU, generate reference sequences for a second FDO, and output them to the second detection block 422.

Meanwhile, the first detection block 421 may include 8 detectors (i.e., detectors #0 to #7). The first detection block 421 may detect 8 preambles for the first FDO by operating all of the 8 detectors. The second detection block 422 may also include 8 detectors (i.e., detectors #8 to #15). The second detection block 422 may detect 8 preambles for the second FDO by operating all of the 8 detectors.

Figure 5:
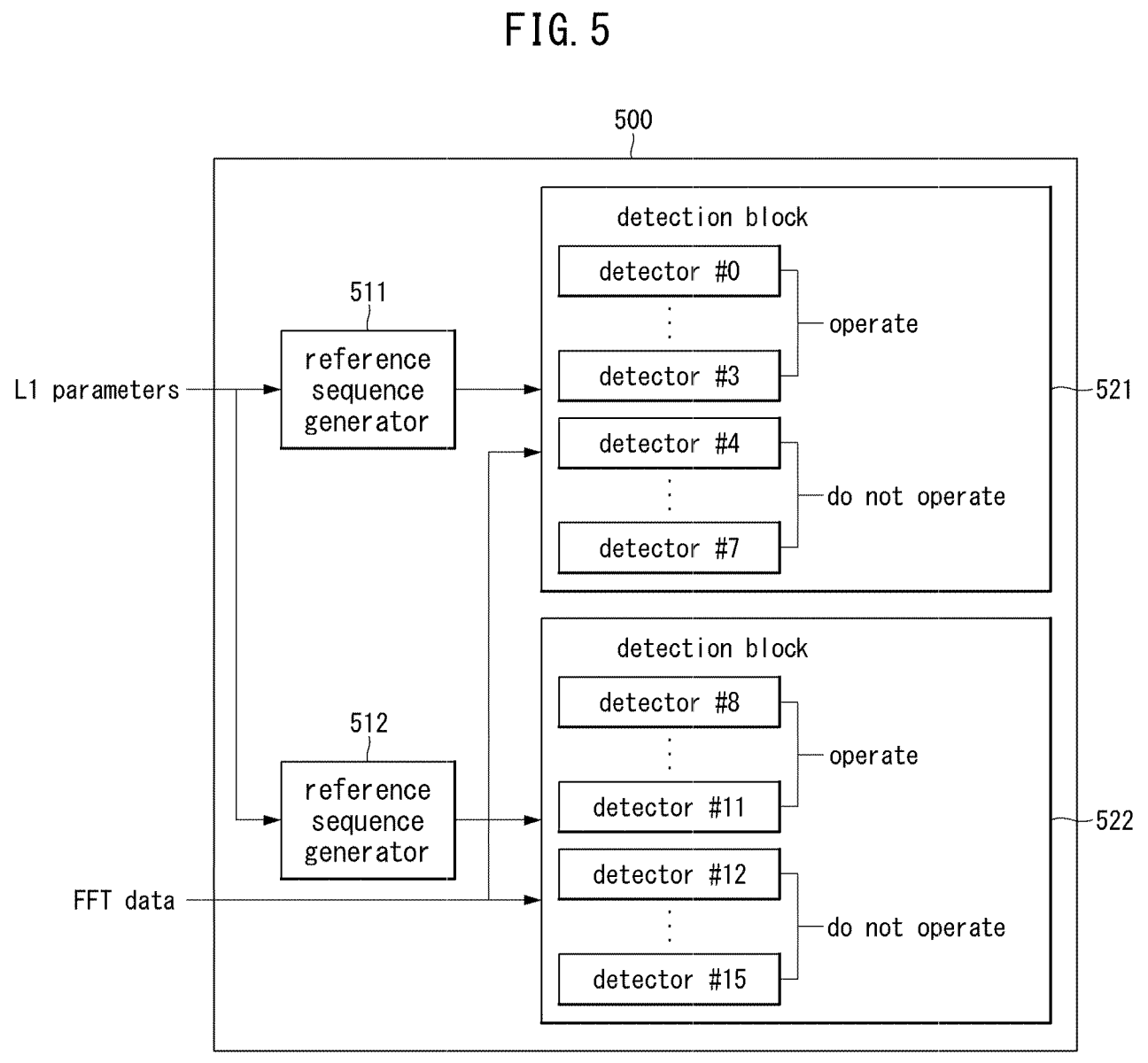

FIG. 5 is a conceptual diagram illustrating a second exemplary embodiment of a PRACH detection method using a PRACH detection apparatus.

Referring to FIG. 5, a PRACH detection apparatus 500 may include two reference sequence generators 511 and 512 and two detection blocks 521 and 522. Here, the first reference sequence generator 511 may receive L1 parameters from an RU, generate reference sequences for a first FDO, and output them to the first detection block 521. In addition, the second reference sequence generator 512 may receive L1 parameters from the RU, generate reference sequences for a second FDO, and output them to the second detection block 522.

Meanwhile, the first detection block 521 may include 8 detectors (i.e., detectors #0 to #7). The first detection block 521 may detect 4 preambles for the first FDO by operating 4 detectors (e.g., detector #0 to #3) among the 8 detectors. In this case, the first detection block 521 may not operate the remaining 4 detectors (e.g., detectors #4 to #7) among the 8 detectors.

The second detection block 522 may also include 8 detectors (i.e., detectors #8 to #15). The second detection block 522 may detect 4 preambles for the second FDO by operating 4 detectors (e.g., detectors #8 to #11) among the 8 detectors. In this case, the second detection block 522 may not operate the remaining 4 detectors (e.g., detectors #12 to #15) among the 8 detectors.

The PRACH detection apparatus of FIGS. 4 and 5 may include two reference sequence generators and two detection blocks. Each of the two detection blocks may include 8 detectors. The PRACH detection apparatus may process two FDOs and may have no difficulty in detecting 4 preambles for each FDO.

The PRACH detection apparatus may have difficulty in detecting 4 preambles for each FDO by processing 4 FDOs. In this case, although the PRACH detection apparatus has a sufficient number of detectors, but cannot consider a third FDO and a fourth FDO. Further, the PRACH detection apparatus may have difficulty in assigning the detectors to each FDO and classifying results from the detectors. Therefore, when the PRACH detection apparatus needs to detect 4 preambles for each FDO by processing 4 FDOs, redesign of an internal structure or corresponding considerations may be required at a design stage. In this reason, since it is necessary to determine the PRACH performance requirements of the communication system to be implemented before implementing the PRACH detection apparatus, it may be very difficult to change the PRACH detection apparatus once implemented.

Accordingly, the present disclosure proposes a structure and internal operations of a reconfigurable PRACH detection apparatus corresponding to a DU conforming to the functional split option 7-2 of 5G or NR. The reconfigurable PRACH detection apparatus may facilitate reconfiguration of PRACH detection operations according to configuration information. As a result, the reconfigurable PRACH detection apparatus can provide flexibility in system requirements and reduce power consumption.

Figure 6:
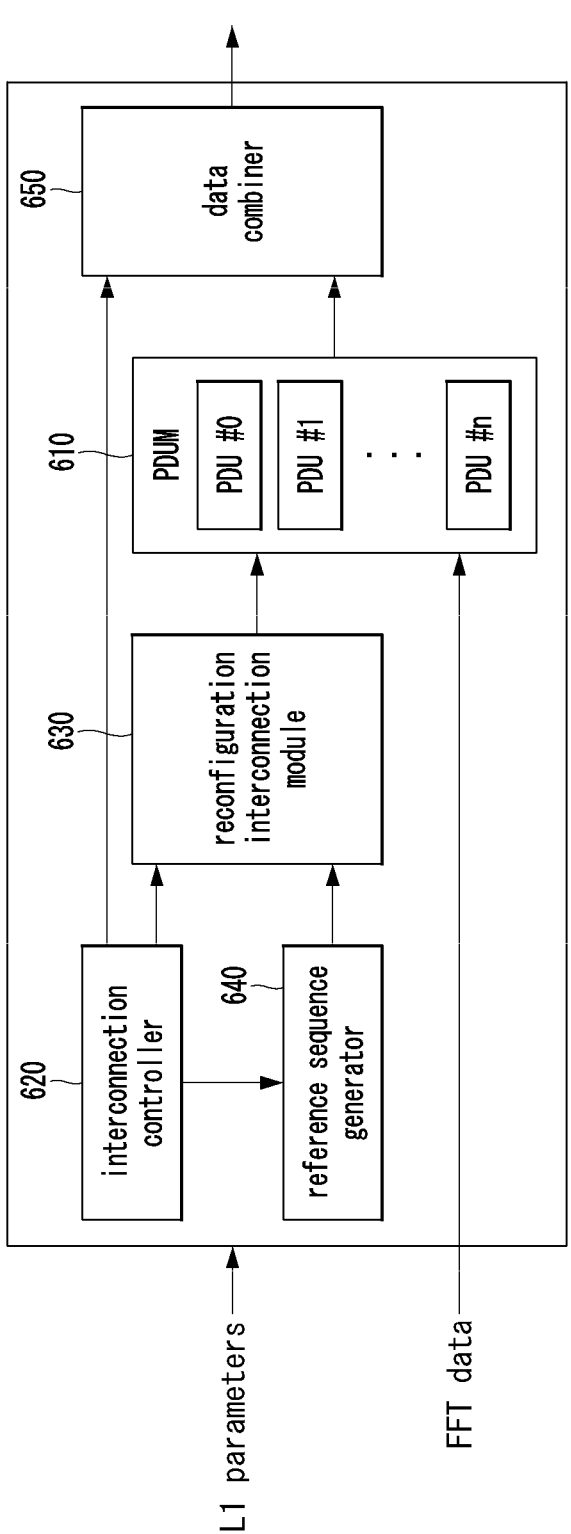
FIG. 6 is a block diagram illustrating a second exemplary embodiment of a PRACH detection apparatus in a communication system.

FIG. 6 is a block diagram illustrating a second exemplary embodiment of a PRACH detection apparatus in a communication system.

Referring to FIG. 6, a PRACH detection apparatus may include a PRACH detection unit module (PDUM) 610 configured as a set of PRACH detection units (PDUs, e.g., PDU #0 to PDU #n) by taking each PDU as a basic unit, which is a core unit that operates in the same manner for any FDO. In addition, the PRACH detection apparatus may include an interconnection controller (IC) 620 that reconfigures the PDUs according to FDOs. In addition, the PRACH detection apparatus may include a reconfiguration interconnection module (RIM) 630 that reconfigures connections of the PDUs within the PDUM 610 under control of the IC 620. In addition, the PRACH detection apparatus may include, for each FDO, a reference sequence generator (RSG) 640 that generates reference sequences to be detected for each FDO. Further, the PRACH detection apparatus may include a data combiner (DC) 650. As described above, the PRACH detection apparatus may be configured with 5 main components.

In this regard, the DU may assign preambles to each FDO of a plurality of FDOs. As an example, the DU may assign 4 preambles (e.g., preamble index 0, preamble index 1, preamble index 2, and preamble index 3) to a FDO #0. In addition, the DU may assign 4 preambles (e.g., preamble index 4, preamble index 5, preamble index 6, and preamble index 7) to a FDO #1. Accordingly, an L1 control processor of the DU may provide PRACH-related RRC parameters to the IC 620. The PRACH-related RRC parameters may include a preamble index for each preamble among the preambles assigned to each FDO. Alternatively, the PRACH-related RRC parameters may include the number of FDOs, the number of preambles per FDO, an initialization sequence of the preamble, and/or the like.

In addition, the DU may provide terminals with information on the preambles assigned to each of the plurality of FDOs. Then, each terminal may receive the information on the preambles assigned to each of the plurality of FDOs from the DU. Further, each terminal may select a preamble from among preambles assigned to an FDO and transmit the selected preamble to the DU using the corresponding FDO. Then, the DU may receive the preamble transmitted by the terminal, which is selected from among the preambles assigned to each FDO, through the corresponding FDO.

In the above-described situation, the IC 620 may receive information on assignment of the preambles for the plurality of FDOs from the L1 control processor of the DU, and generate reconfiguration information including information on preamble indexes of detection target preambles, which is use for assigning PDUs to the respective FDOs. Here, the information on assignment of the preambles may include a preamble index of each preamble among the preambles assigned to each FDO.

Meanwhile, the ID 620 may deliver the generated reconfiguration information to the RIM 630 and the DC 650. Here, the reconfiguration information may have a format of {FDO index, preamble indexes of detection target preambles assigned to each FDO}. For example, the detection target preamble indexes assigned to the FDO #0 may be #0 to #3, and the detection target preamble indexes assigned to the FDO #1 may be #4 to #7. Then, the IC 620 may deliver two sets of reconfiguration information, such as {0, 0, 1, 2, 3} and {1, 4, 5, 6, 7}, to the RIM 630 and the DC 650.

In addition, the IC 620 may transmit a reconfiguration information delivery completion signal to the RSG 640 along with the reconfiguration information. Then, the RSG 640 may receive the reconfiguration information delivery completion signal and the reconfiguration information from the IC 620. Then, the RSG 640 may generate reference sequence information based on the reconfiguration information and transmit the generated reference sequence information to the RIM 630.

Alternatively, the L1 control processor of the DU may provide the PRACH-related RRC parameters to the RSG 640. The PRACH-related RRC parameters may include a preamble index for each preamble of the preambles assigned to each FDO. Alternatively, the PRACH-related RRC parameters may include the number of FDOs, the number of preambles per FDO, an initialization sequence of the preamble, and/or the like. The IC 620 may transmit a reconfiguration information delivery completion signal to the RSG 640.

Then, the RSG 640 may receive the reconfiguration information delivery completion signal from the IC 620. In addition, the RSG 640 may generate reference sequence information based on the PRACH-related RRC parameters received from the L1 control processor of the DU, and transmit the generated reference sequence information to the RIM 630.

Figure 7:
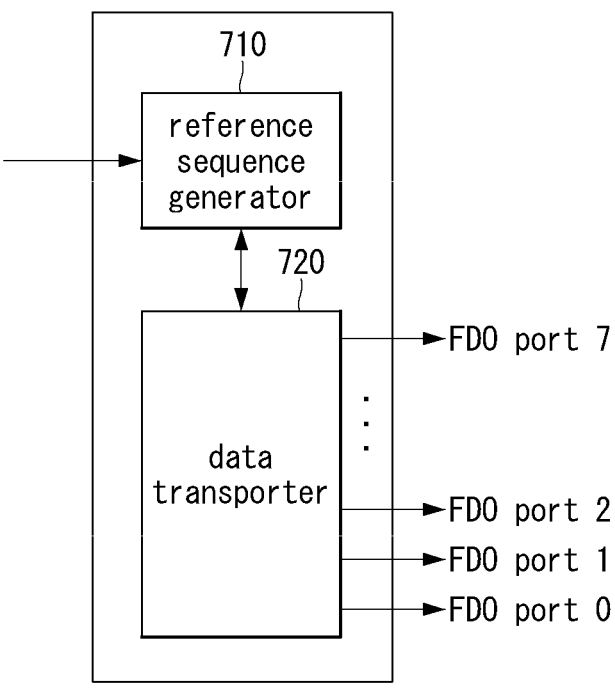
FIG. 7 is an internal block diagram illustrating the reference sequence generator of FIG. 6.

FIG. 7 is an internal block diagram illustrating the reference sequence generator of FIG. 6.

Referring to FIG. 7, the RSG may include a reference generator 710 and a data transporter 720. The L1 control processor of the DU may provide PRACH-related RRC parameters to the reference generator 710 of the RSG. The PRACH-related RRC parameters may include a preamble index for each preamble of the preambles assigned to each FDO. Alternatively, the PRACH-related RRC parameters may include the number of FDOs, the number of preambles per FDO, an initialization sequence of the preamble, and/or the like.

Then, the reference generator 710 may receive the PRACH-related RRC parameters from the L1 control processor implemented as a microprocessor. Thereafter, the reference generator 710 may identify reference preamble indexes that serve as detection references for each FDO with respect to a plurality of FDOs to be detected by the PRACH detection apparatus. Here, the reference preamble index may be the same as a preamble index of each preamble of the preambles assigned to each FDO. Alternatively, a preamble index corresponding to the reference preamble index and a preamble index of each preamble assigned to each FDO may be different.

The RSG may generate a reference sequence for each of the identified reference preamble indexes using the PRACH-related RRC parameters provided by the L1 control processor. The reference generator may generate FDO reference sequence information including a reference sequence corresponding to the reference preamble index assigned to each FDO and deliver it to the data transporter 720.

In this case, the reference generator 710 may configure the FDO reference sequence information in a form of {FDO index, reference preamble index, reference sequence}, and deliver it to the data transported 720. Then, the data transporter 720 may receive the FDO reference sequence information generated by the reference generator 710. In other words, the data transporter 720 may receive the FDO reference sequence information including the reference sequence corresponding to each of the reference preamble indexes that are detection references for each FDO, which is generated by the reference generator 710.

In addition, the data transporter 720 may deliver the FDO reference sequence information to the PDUM by outputting the FDO reference sequence information received from the reference generator 710 to a FDO port, which is an output port assigned for each FDO. In the 5G technical specification, there may be up to 8 PRACH FDOs. Therefore, there may be 8 FDO ports. These FDO ports may be adjusted to fit a system to implement. The data transporter 720 may configure the reference sequence information in a form of {reference preamble index, reference sequence}, and deliver it to the PDUM. Alternatively, the data transporter 720 may configure the reference sequence information in a form of {FDO index, reference preamble index, reference sequence}, and deliver it to the PDUM.

Referring again to FIG. 6, for example, the number of PRACH FDOs may be 2, that is, there may be FDO #0 and FDO #1. In this case, the FDO #0 may use reference preamble indexes 0 to 7, and the FDO #1 may use reference preamble indexes 8 to 15. The RSG 640 may use the RRC parameters to generate reference sequences corresponding to the reference preamble indexes 0 to 7 used in the FDO #0 and reference sequences corresponding to the reference preamble indexes 8 to 15 used in the FDO #1.

The RSG 640 may output the reference sequence information consisting of the 16 reference sequences thus generated in a designated format after identifying the reconfiguration information delivery completion signal received from the IC 620. The reference sequence information may be transmitted through the corresponding FDO port in a form of {reference preamble index, reference sequence}. For example, the reference sequence information for the FDO #0 may be output to the RIM 630 through the FDO port 0 as being configured in the form of {0, reference sequence for reference preamble index 0}, {1, reference sequence for reference preamble index 1}, . . . , and {7, reference sequence for reference preamble index 7}. The reference sequence information for the FDO #1 may be output to the RIM 630 through the FDO port 1 as being configured in the form of {8, reference sequence for reference preamble index 8}, {9, reference sequence for reference preamble index 9}, . . . , and {15, reference sequence for reference preamble index 15}.

Figure 8:
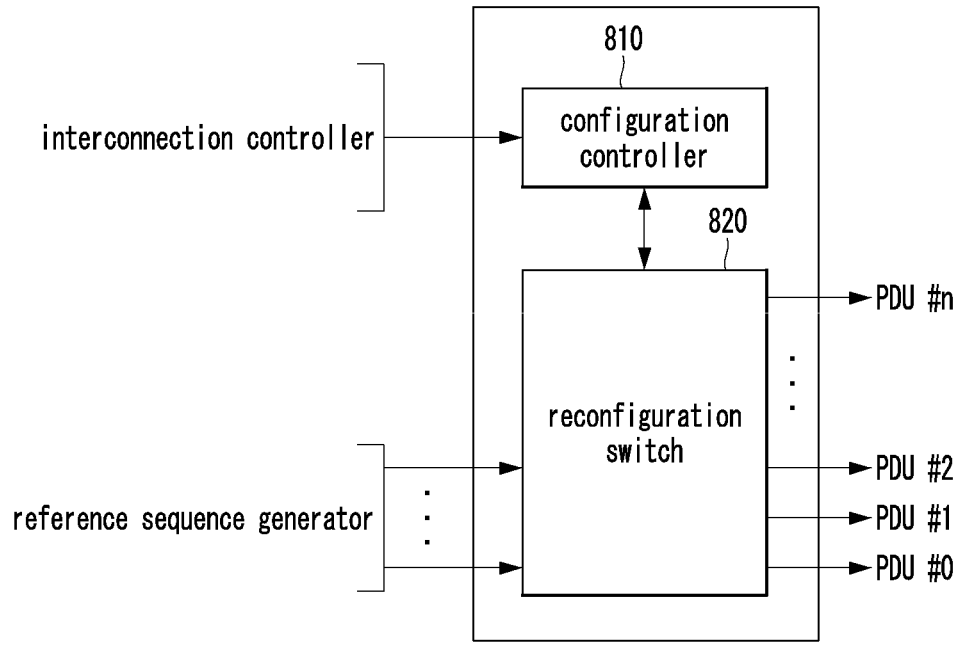
FIG. 8 is a block diagram illustrating a first exemplary embodiment of the reconfiguration interconnection module of FIG. 6.

FIG. 8 is a block diagram illustrating a first exemplary embodiment of the reconfiguration interconnection module of FIG. 6.

Referring to FIG. 8, the RIM may include a configuration controller 810 and a reconfiguration switch 820. Here, the configuration controller 810 may receive the reconfiguration information including detection target preamble indexes for assigning PDUs to each FDO from the IC. In addition, the configuration controller 810 may receive the FDO reference sequence information from the RSG 640. Here, the reference preamble index may be the same as the preamble index of each preamble of the detection target preambles assigned to each FDO.

Meanwhile, the configuration controller 810 may generate connection information of input ports and output ports of the reconfiguration switch 820 based on the reconfiguration information and reference sequence information. Here, each of the input ports of the reconfiguration switch 820 may correspond to an FDO. Accordingly, each of the input ports of the reconfiguration switch 820 may be identified by an FDO index. In addition, each of the output ports of the reconfiguration switch 820 may be connected to an input port of a PDU. Accordingly, each of the output ports of the reconfiguration switch 820 may be identified by a PDU index. Considering the above-described configuration, the configuration controller 810 may generate the connection information of input ports and output ports of the reconfiguration switch 820 by using the FDO indexes, detection target preamble indexes, and PDU indexes based on the reconfiguration information and reference sequence information.

For example, the configuration controller 810 may assign a PDU index to a preamble index to be detected for each FDO of a plurality of FDOs based on the reconfiguration information. In addition, the configuration controller 810 may set a detection target preamble-PDU matching index to distinguish a matching relationship between the detection target preamble index of each FDO and a PDU index of a PDU assigned to the detection target preamble index. In addition, the configuration controller 810 may generate detection target preamble-PDU matching index information consisting of a detection target preamble index, a PDU index, and a detection target preamble-PDU matching index for each FDO index. Alternatively, the configuration controller 810 may generate reference preamble-PDU matching index information consisting of a reference preamble index, a PDU index, and a reference preamble-PDU matching index for each FDO index. In this case, the detection target preamble index and the reference preamble index may be the same. Then, the detection target preamble-PDU matching index information and the reference preamble-PDU matching index information may be the same.

In other words, the configuration controller 810 may generate detection target preamble-PDU matching index information configured in a form of {FDO index, detection target preamble index, PDU index, detection target preamble-PDU matching index}. Alternatively, the configuration controller 810 may generate reference preamble-PDU matching index information configured in a form of {FDO index, reference preamble index, PDU index, reference preamble-PDU matching index}. The detection target preamble-PDU matching index information generated as described above may be connection information between input ports and output ports of the reconfiguration switch 820. Alternatively, the reference preamble-PDU matching index information may be connection information between input ports and output ports of the reconfiguration switch 820. In this case, the configuration controller 810 may generate deactivation information including PDU indexes for unused PDU ports.

Then, the configuration controller 810 may deliver the connection information between input ports and output ports to the reconfiguration switch 820, and the reconfiguration switch 820 may receive the connection information between input ports and output ports from the configuration controller 810. Accordingly, the reconfiguration switch 820 may activate a connection path between each input port and an output port corresponding to each input port based on the connection information between input ports and output ports.

As described above, the reconfiguration switch 820 may receive the connection information between input ports and output ports from the configuration controller 810, and configure connections between the input ports and the output ports according to the received connection information. In other words, the reconfiguration switch 820 may activate or deactivate internal connections between the input ports and the output ports based on the connection information between input ports and output ports. Accordingly, the reconfiguration switch 820 may reconfigure the PDUs by changing the connections between the input ports through which the reference sequences are received and the output ports through which the reference sequences are delivered. In addition, the configuration controller may minimize power consumption by delivering deactivation information for unused PDUs to the corresponding PDUs within the PDUM.

Figure 9:
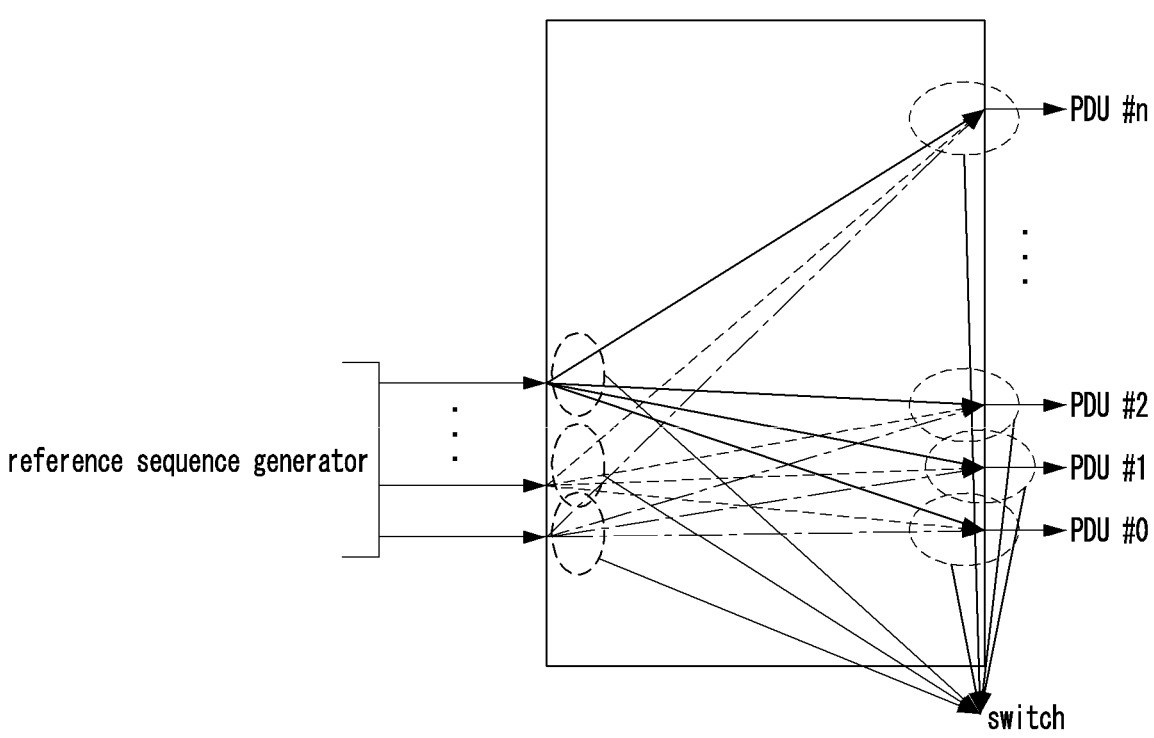
FIG. 9 is a block diagram illustrating a first exemplary embodiment of the reconfiguration switch of FIG. 8.

FIG. 9 is a block diagram illustrating a first exemplary embodiment of the reconfiguration switch of FIG. 8.

Referring to FIG. 9, the reconfiguration switch may use a crossbar switch structure. The reconfiguration switch may receive, from the configuration controller, connection information between input ports and output ports and a reference preamble-PDU matching index assigned to a connection path between an input port and an output port. Accordingly, the reconfiguration switch may activate a connection path between each input port to an output port corresponding thereto using the connection information between input ports and output ports and a reference preamble-PDU matching index assigned to the connection path between the input port and the output port. In addition, the reconfiguration switch may designate the reference preamble-PDU matching index assigned to the connection path between the input port and the output port to the activated connection path. Through the above-described process, the reference sequence of the corresponding reference preamble index may be delivered to the assigned PDU.

Figure 10:
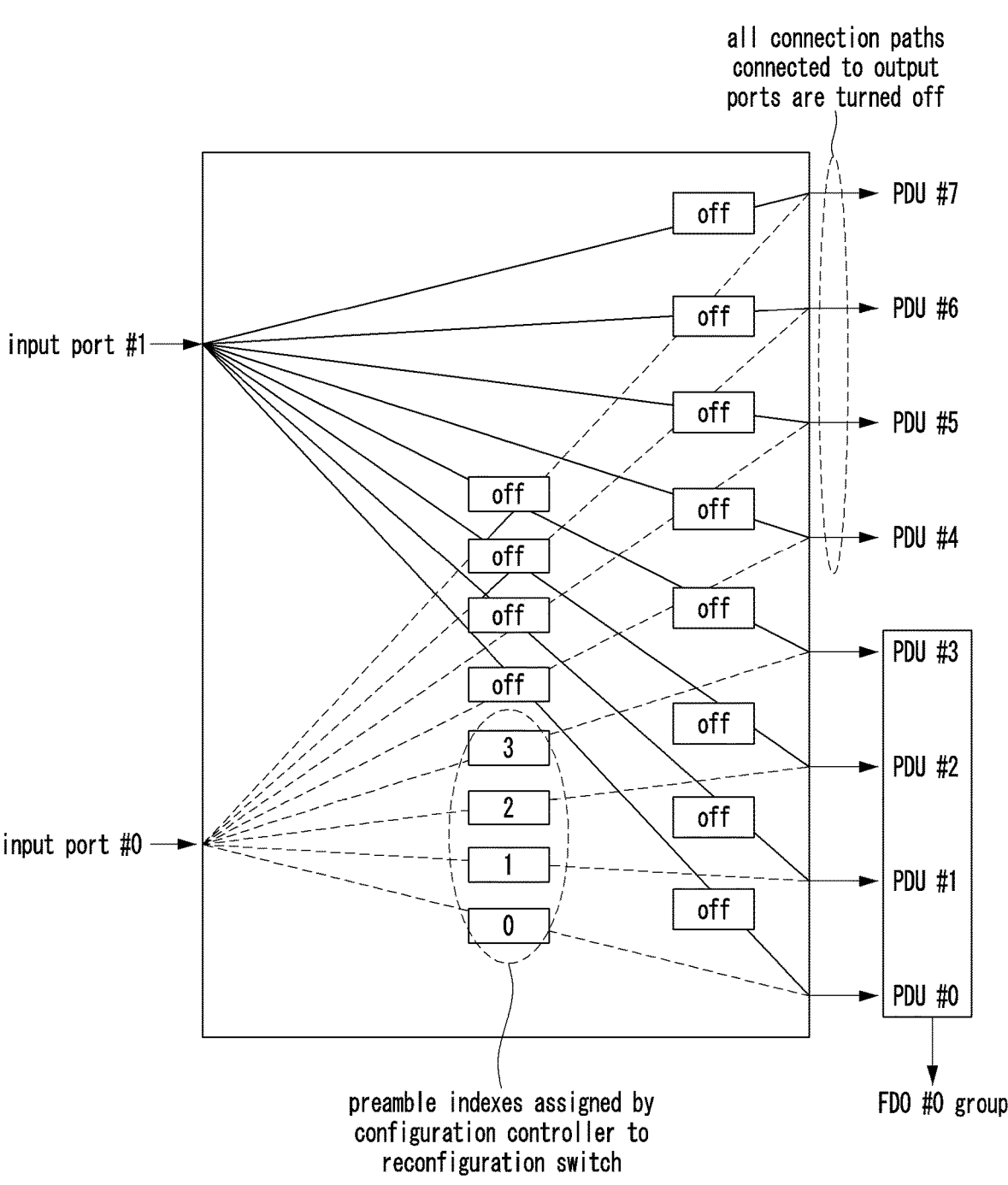
FIG. 10 is a block diagram illustrating a second exemplary embodiment of the reconfiguration switch of FIG. 8.

FIG. 10 is a block diagram illustrating a second exemplary embodiment of the reconfiguration switch of FIG. 8.

Referring to FIG. 10, the reconfiguration switch may have a 2×8 crossbar switch structure with 2 input ports (i.e., FDO #0, FDO #1) and 8 output ports (i.e., PDU #0 to PDU #7). The reconfiguration switch may form 8 connection paths (i.e., connection path #0 to connection path #7) between the input port FDO #0 and the 8 output ports. Here, the connection path may correspond to the detection target preamble-PDU matching index.

The reconfiguration switch may form 8 connection paths (i.e., connection path #8 to connection path #15) between the input port FDO #1 and the 8 output ports.

A PRACH detection apparatus equipped with the above-described reconfiguration switch may use two FDOs. In addition, the number of PDUs within the PDUM may be up to 8. In the above-described situation, the PRACH detection apparatus may use one FDO in a limited manner, and the PRACH detection apparatus can detect 4 preambles in the corresponding FDO.

To this end, the reconfiguration switch may activate the connection paths #0 to #3 among the connection paths for the input port FDO #0, and turn off the remaining connection paths to inactivate them. In addition, the reconfiguration switch may deactivate the connection paths for the input port #1 by turning them off. In this case, the reconfiguration switch may assign a detection target preamble-PDU matching index 0 to the connection path #0 among the connection paths for the input port #0. In addition, the reconfiguration switch may assign a detection target preamble-PDU matching index 1 to the connection path #1 among the connection paths for the input port FDO #0. In addition, the reconfiguration switch may assign a detection target preamble-PDU matching index 2 to the connection path 2 among the connection paths for the input port FDO #0. In addition, the reconfiguration switch may assign a detection target preamble-PDU matching index 3 to the connection path #3 among the connection paths for the input port FDO #0.

In the above-described situation, the reconfiguration switch may receive the reference sequence for the reference preamble index 0 through the input port FDO #0, and the reconfiguration switch may deliver the reference sequence for the reference preamble index 0 to the output port PDU #0 by using the connection path #0 to which the detection target preamble-PDU matching index 0 of the input port FDO #0 and the output port PDU #0 is assigned. In addition, the reconfiguration switch may receive the reference sequence for the reference preamble index 1 through the input port FDO #0, and the reconfiguration switch may deliver the reference sequence for the reference preamble index 1 to the output port PDU #1 by using the connection path #1 to which the detection target preamble-PDU matching index 1 of the input port FDO #0 and the output port PDU #1 is assigned.

In addition, the reconfiguration switch may receive the reference sequence for the reference preamble index 2 through the input port FDO #0, and the reconfiguration switch may deliver the reference sequence for the reference preamble index 2 to the output port PDU #2 by using the connection path #2 to which the detection target preamble-PDU matching index 2 of the input port FDO #0 and the output port PDU #2 is assigned. In addition, the reconfiguration switch may receive the reference sequence for the reference preamble index 3 through the input port FDO #0, and the reconfiguration switch may deliver the reference sequence for the reference preamble index 3 to the output port PDU #3 by using the connection path #3 to which the detection target preamble-PDU matching index 3 of the input port FDO #0 and the output port PDU #3 is assigned.

As described above, data received at the reconfiguration switch may be delivered to the PDUs according to the detection target preamble-PDU matching indexes assigned to the connection paths connected to the input port FDO #0 and the output ports. In this case, the data {0, reference sequence for reference preamble index 0} input to the input port FDO #0 may be delivered to the output port to which the corresponding PDU #0 is connected through the connection path #0 to which the detection target preamble-PDU matching index 0 is assigned. In this case, data {reference sequence for reference preamble index 0} obtained by excluding the reference preamble index while passing through the reconfiguration switch may be finally transmitted to the PDU #0.

The data {1, reference sequence for reference preamble index 1} input to the input port FDO #0 may be delivered to the output port to which the corresponding PDU #1 is connected through the connection path #1 to which the detection target preamble-PDU matching index 1 is assigned. In this case, data {reference sequence for reference preamble index 1} obtained by excluding the reference preamble index while passing through the reconfiguration switch may be finally transmitted to the PDU #1.

In addition, the data {2, reference sequence for reference preamble index 2} input to the input port FDO #0 may be delivered to the output port to which the corresponding PDU #2 is connected through the connection path #2 to which the detection target preamble-PDU matching index 2 is assigned. In this case, data {reference sequence for reference preamble index 2} obtained by excluding the reference preamble index while passing through the reconfiguration switch may be finally transmitted to the PDU #2.

In addition, the data {3, reference sequence for reference preamble index 3} input to the input port FDO #0 may be delivered to the output port to which PDU #3 is connected through the connection path #3 to which the detection target preamble-PDU matching index 3 is assigned. In this case, data {reference sequence for reference preamble index 3} obtained by excluding the reference preamble index while passing through the reconfiguration switch may be finally transmitted to the PDU #3. Meanwhile, in the case of unused PDUs, all connection paths connected to the output ports connected to the corresponding PDUs may be in an off state. In this case, operations of the PDUs may be turned off by delivering deactivation information to the PDUs.

Figure 11:
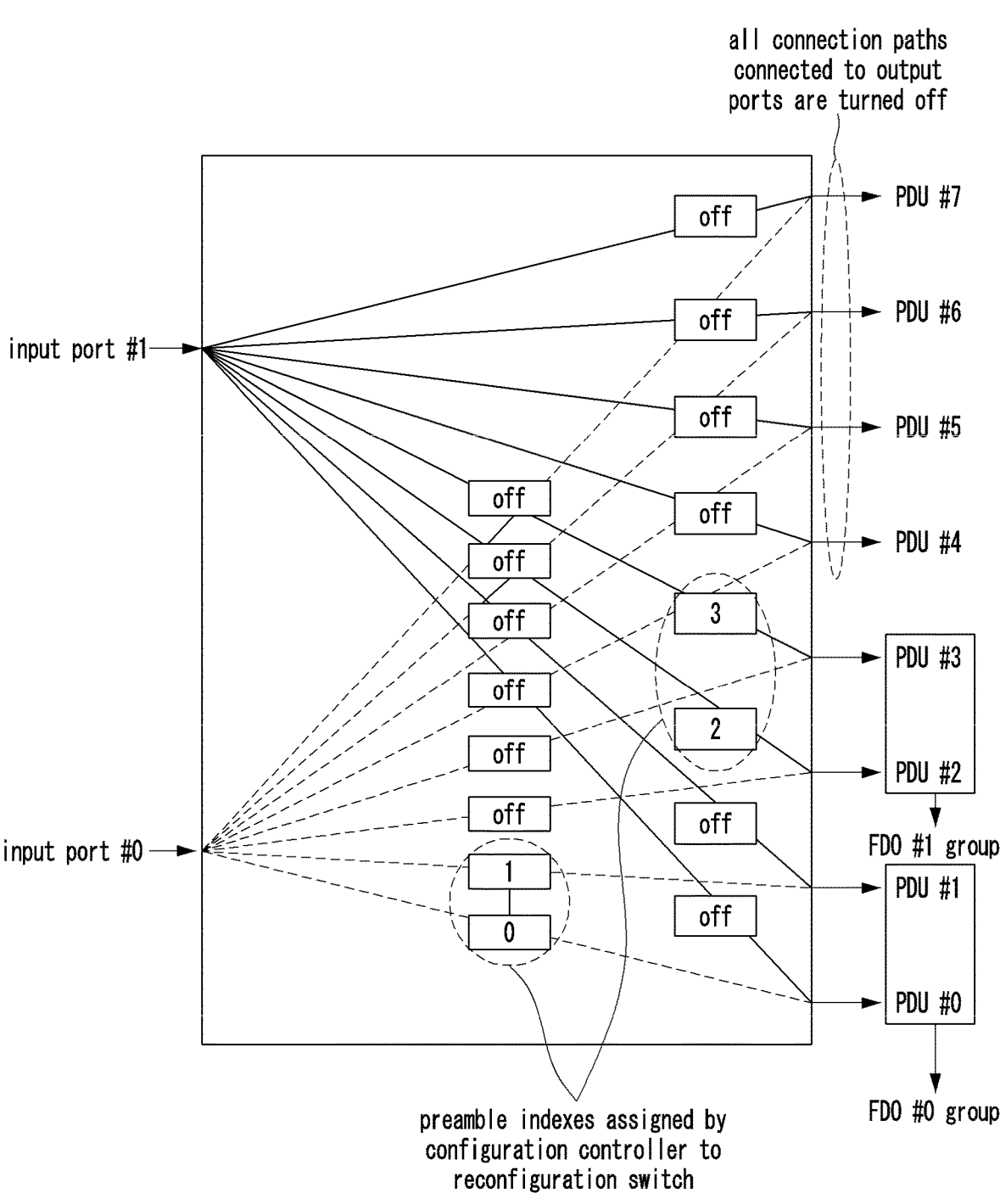
FIG. 11 is a block diagram illustrating a third exemplary embodiment of the reconfiguration switch of FIG. 8.

FIG. 11 is a block diagram illustrating a third exemplary embodiment of the reconfiguration switch of FIG. 8.

Referring to FIG. 11, the reconfiguration switch may have a 2×8 crossbar switch structure with two input ports (i.e., FDO #0, FDO #1) and 8 output ports (i.e., PDU #0 to PDU #7). The reconfiguration switch may have 8 connection paths (i.e., connection paths #0 to #7) formed between the input port FDO #0 and the 8 output ports. In addition, the reconfiguration switch may have 8 connection paths (i.e., connection paths #8 to #15) formed between the input port FDO #1 and the 8 output ports.

A PRACH detection apparatus equipped with the above-described reconfiguration switch may use two FDOs. In addition, the number of PDUs within the PDUM may be up to 8. In the above-described situation, the PRACH detection apparatus may use two FDOs, and the PRACH detection apparatus can detect 2 preambles in the corresponding FDO.

To this end, the reconfiguration switch may activate the connection paths #0 and #1 among the connection paths for the input port FDO #0, and turn off the remaining connection paths to inactivate them. In addition, the reconfiguration switch may activate the connection paths #10 and #11 among the connection paths for the input port FDO #1, and turn off the remaining connection paths to inactivate them. In this case, the reconfiguration switch may assign a detection target preamble-PDU matching index 0 to the connection path #0 among the connection paths for the input port #0. In addition, the reconfiguration switch may assign a detection target preamble-PDU matching index 1 to the connection path #1 among the connection paths for the input port FDO #0. In addition, the reconfiguration switch may assign a detection target preamble-PDU matching index 2 to the connection path 10 among the connection paths for the input port FDO #1. In addition, the reconfiguration switch may assign a detection target preamble-PDU matching index 3 to the connection path 11 among the connection paths for the input port FDO #1.

In the above-described situation, the reconfiguration switch may receive the reference sequence for the reference preamble index 0 through the input port FDO #0, and the reconfiguration switch may deliver the reference sequence for the reference preamble index 0 to the output port PDU #0 by using the connection path #0 to which the detection target preamble-PDU matching index 0 of the input port FDO #0 and the output port PDU #0 is assigned. In addition, the reconfiguration switch may receive the reference sequence for the reference preamble index 1 through the input port FDO #0, and the reconfiguration switch may deliver the reference sequence for the reference preamble index 1 to the output port PDU #1 by using the connection path #1 to which the detection target preamble-PDU matching index 1 of the input port FDO #0 and the output port PDU #1 is assigned.

In addition, the reconfiguration switch may receive the reference sequence for the reference preamble index 2 through the input port FDO #1, and the reconfiguration switch may deliver the reference sequence for the reference preamble index 2 to the output port PDU #2 by using the connection path #10 to which the detection target preamble-PDU matching index 2 of the input port FDO #1 and the output port PDU #2 is assigned. In addition, the reconfiguration switch may receive the reference sequence for the reference preamble index 3 through the input port FDO #1, and the reconfiguration switch may deliver the reference sequence for the reference preamble index 3 to the output port PDU #3 by using the connection path #11 to which the detection target preamble-PDU matching index 3 of the input port FDO #1 and the output port PDU #3 is assigned.

As described above, data received at the reconfiguration switch may be delivered to the PDUs according to the detection target preamble-PDU matching indexes assigned to the connection paths connected to the input port FDOs #0 and #1 and the output ports. In this case, the data {0, reference sequence for reference preamble index 0} input to the input port FDO #0 may be delivered to the output port to which the corresponding PDU #0 is connected through the connection path #0 to which the detection target preamble-PDU matching index 0 is assigned. In this case, data {reference sequence for reference preamble index 0} obtained by excluding the reference preamble index while passing through the reconfiguration switch may be finally transmitted to the PDU #0.

The data {1, reference sequence for reference preamble index 1} input to the input port FDO #0 may be delivered to the output port to which the corresponding PDU #1 is connected through the connection path #1 to which the detection target preamble-PDU matching index 1 is assigned. In this case, data {reference sequence for reference preamble index 1} obtained by excluding the reference preamble index while passing through the reconfiguration switch may be finally transmitted to the PDU #1.

In addition, the data {2, reference sequence for reference preamble index 2} input to the input port FDO #1 may be delivered to the output port to which the corresponding PDU #2 is connected through the connection path #10 to which the detection target preamble-PDU matching index 2 is assigned. In this case, data {reference sequence for reference preamble index 2} obtained by excluding the reference preamble index while passing through the reconfiguration switch may be finally transmitted to the PDU #2.

In addition, the data {3, reference sequence for reference preamble index 3} input to the input port FDO #1 may be delivered to the output port to which PDU #3 is connected through the connection path #11 to which the detection target preamble-PDU matching index 3 is assigned. In this case, data {reference sequence for reference preamble index 3} obtained by excluding the reference preamble index while passing through the reconfiguration switch may be finally transmitted to the PDU #3. Meanwhile, in the case of unused PDUs, all connection paths connected to the output ports connected to the corresponding PDUs may be in an off state. In this case, operations of the PDUs may be turned off by delivering deactivation information to the PDUs.

Figure 12:
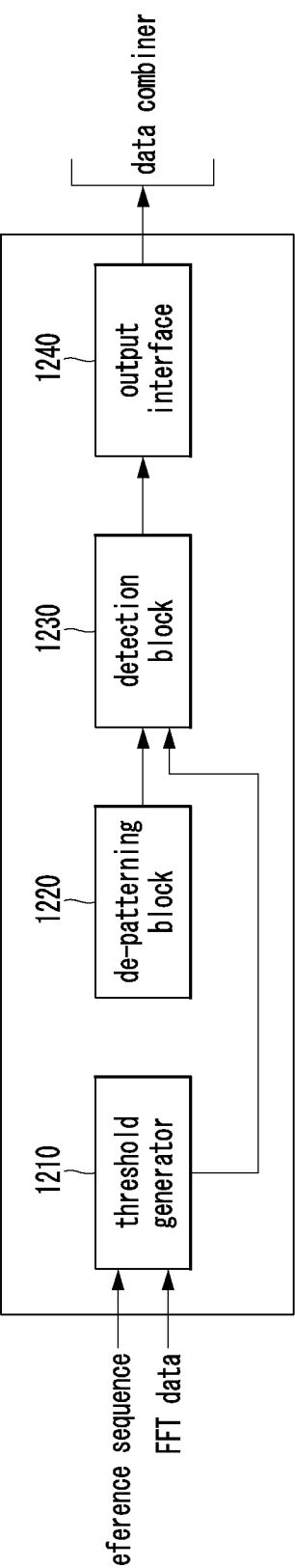
FIG. 12 is a block diagram illustrating a first exemplary embodiment of the PRACH detection unit of FIG. 6.

FIG. 12 is a block diagram illustrating a first exemplary embodiment of the PRACH detection unit of FIG. 6.

Referring to FIG. 12, the PDU may include a threshold generator 1210, a de-patterning block 1220, a detection block 1230, and an output interface 1240. Here, threshold generator 1210 may receive a reference sequence from the RIM, and may generate a threshold with reference to the received reference sequence and provide the generated threshold to the detection block 1230.

The de-patterning block 1220 may receive the reference sequence from the RIM and may receive FFT data from an RU. Then, the de-patterning block 1220 may perform element-wise conjugate product, IFFT, and combining using the received reference sequence and FFT data.

That is, the de-patterning block 1220 may match the reference sequence of the preamble index to be detected with the FFT data input from the RU. In addition, the de-patterning block 1220 may generate time shift information indicating a degree of a time-axis shift of the FFT data of the RU compared to the reference sequence corresponding to the preamble index. Here, the FFT data of the RU and the values of the reference sequence corresponding to the preamble index to be detected may match.

In this case, a result of performing IFFT on a conjugate product between the two data may have a peak value at 0 on the time axis. When the FFT data of the RU, which is shifted on the time axis, is matched with the values of the reference sequence, an output of performing IFFT on a conjugate product between the two data may have a peak at the time-shifted location of an input waveform of the RU. The de-patterning block 1220 may iteratively perform the above-described process on received PRACH symbols and combine values therefrom, and may provide a result of the combining to the detection block 1230.

Accordingly, the detection block 1230 may receive the reference sequence from the RIM, may receive the threshold from threshold generator 1210, and may receive the output of de-patterning block 1220. In addition, the detection block 1230 may check whether the output of the de-patterning block 1220 is greater than the threshold. In addition, the detection block 1230 may use the results to output a finally detected preamble index and an offset value therefor on the time axis.

In addition, the detection block 1230 may output number (s) indicating slot(s), symbol(s), frame(s), FDO(s), and the like where the detection has been performed. The detection block may perform the above-described processes in parallel for reference sequences to be detected for each FDO. The PDU may perform the above-described role in a high physical layer for a DU of the functional split option 7-2, and may detect one preamble. The PDU may detect and output the preamble index and a timing advance (TA) therefor from the FFT data received from the RU.

Figure 13:
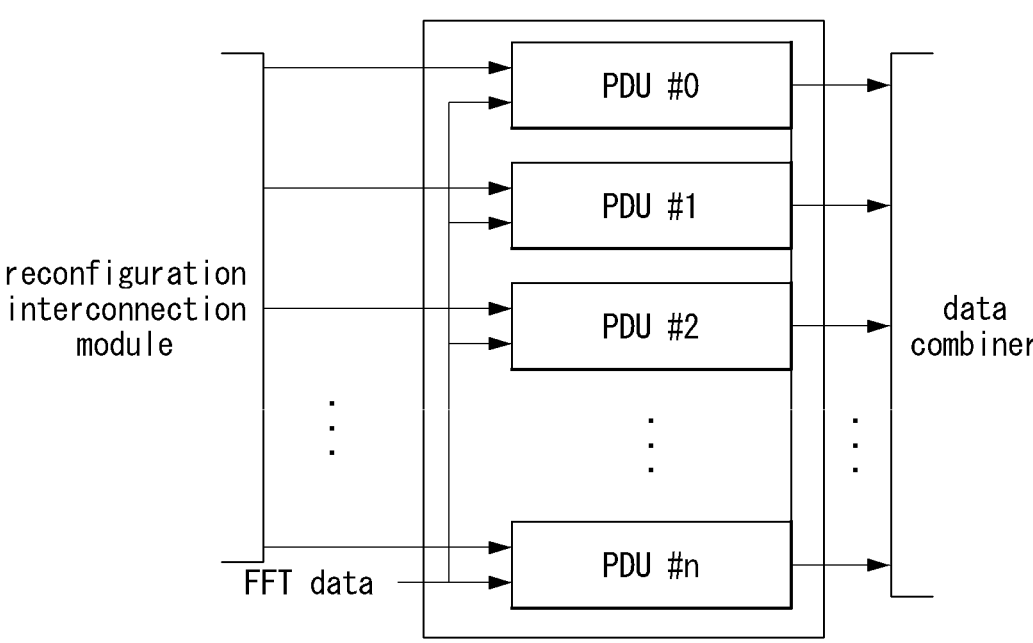
FIG. 13 is a block diagram illustrating a first exemplary embodiment of the PRACH detection unit module of FIG. 6.

FIG. 13 is a block diagram illustrating a first exemplary embodiment of the PRACH detection unit module of FIG. 6.

Referring to FIG. 13, the PDUM may include n PRACH detection units (i.e., PDU #0 to PDU #n). Each of the PDUs may receive reference sequence information from the RIM, and may receive FFT data from the RU. Then, each of the PDUs may detect and output a preamble index and a TA value using the received reference sequence information and FFT data.

Meanwhile, the DC may manage operation results of the respective PDUs assigned to each FDO as output results for each FDO, and deliver them to the outside. For output management for each FDO, the DC may classify and store the outputs for each FDO based on the reconfiguration information provided by the IC, which is the same as what the RIM receives.

FIG. 14 is a flowchart illustrating a first exemplary embodiment of a PRACH detection method in a communication system.

Referring to FIG. 14, a DU may assign preambles to each FDO of a plurality of FDOs. For example, the DU may assign 4 preambles (e.g., preamble indexes 0, 1, 2, and 3) to a FDO #0, and assign 4 preambles (e.g., preamble indexes 4, 5, 6, and 7 to a FDO #1. Accordingly, an L1 control processor of the DU may provide PRACH-related RRC parameters to the IC. The PRACH-related RRC parameters may include a preamble index for each preamble among the preambles assigned to each FDO. Alternatively, the PRACH-related RRC parameters may include the number of FDOs, the number of preambles per FDO, an initialization sequence of the preamble, and/or the like.

In addition, the DU may provide terminals with information on the preambles assigned to each of the plurality of FDOs. Then, each terminal may receive the information on the preambles assigned to each of the plurality of FDOs from the DU. Then, each terminal may select a preamble from among preambles assigned to an FDO, and transmit the selected preamble to the DU using the corresponding FDO. Then, the DU may receive the preamble transmitted by the terminal, which is selected from among the preambles assigned to each FDO, through the corresponding FDO.

Meanwhile, in the PRACH detection method, the PRACH detection apparatus may use the IC to generate reconfiguration information including detection target preamble indexes, which is used for assigning PDUs to each of the plurality of FDOs (S1401). Here, the reconfiguration information may have a format of {FDO index, detection target preamble indexes assigned to each FDO}. For example, the detection target preamble indexes assigned to the FDO #0 may be #0 to #3, and the detection target preamble indexes assigned to the FDO #1 may be #4 to #7. Then, the IC may generate two sets of reconfiguration information, such as {0, 0, 1, 2, 3} and {1, 4, 5, 6, 7}, and transmit them to the RIM and the DC. In addition, the IC may provide a reconfiguration information delivery completion signal to the RSG.

Meanwhile, the RSG may receive the reconfiguration information delivery completion signal from the IC. Accordingly, the RSG may generate FDO reference sequence information including reference sequences for reference preamble indexes assigned to each of the plurality of FDOs (S1402). That is, the RSG may receive the PRACH-related RRC parameters from the L1 control processor of the DU, and may identify the reference preamble indexes that serve as references for each FDO of the plurality of FDOs. Then, the RSG may generate a reference sequence for each of the identified reference preamble indexes using the PRACH-related RRC parameters provided by the L1 control processor. Thereafter, the reference sequence generator may generate reference sequence information including information on the reference sequence for each of the reference preamble indexes. Here, the reference preamble index may be the same as the detection target preamble index. In addition, the PRACH-related RRC parameters may include the number of FDOs, the number of preambles per FDO, an initialization sequence of the preamble, and/or the like.

As an example, the RSG may use the RRC parameters to generate reference sequences corresponding to the reference preamble indexes 0 to 7 used in the FDO #0 and reference sequences corresponding to the reference preamble indexes 8 to 15 used in the FDO #1. The RSG may output reference sequence information including the 16 reference sequences generated as described above in a designated format. The reference sequence information may be transmitted through the corresponding FDO port in a form of {reference preamble index, reference sequence}. The reference sequence information for the FDO #0 may be output to the RIM 630 through the FDO port #0 as being configured in a form of {0, reference sequence for reference preamble index 0}, {1, reference sequence for reference preamble index 1}, . . . , and {7, reference sequence for reference preamble index 7}. The reference sequence information for the FDO #1 may be output to the RIM 630 through the FDO port #1 as being configured in a form of {8, reference sequence for reference preamble index 8}, {9, reference sequence for reference preamble index 9}, . . . , and {15, reference sequence for reference preamble index 15}. Alternatively, the reference sequence information may be transmitted through the corresponding FDO port in form of {FDO index, reference preamble index, reference sequence}.

Meanwhile, the configuration controller of the RIM may receive the reconfiguration information from the IC and generate detection target preamble-PDU matching index information (S1403). That is, the configuration controller may generate matching information of the FDO index, detection target preamble index, and PDU index. Here, the configuration controller may receive the reconfiguration information including detection target preamble indexes, which is used for assigning PDUs to each FDO, from the IC.

Then, the configuration controller may assigning a PDU index to a detection target preamble index of each FDO of the plurality of FDOs based on the reconfiguration information. In addition, the configuration controller may set a detection target preamble-PDU matching index to distinguish a matching relationship between the detection target preamble index of each FDO and the PDU index of the PDU assigned thereto. In addition, the configuration controller 810 may generate detection target preamble-PDU matching index information configured in form of {FDO index, detection target preamble index, PDU index, detection target preamble-PDU matching index}. The detection target preamble-PDU matching index information may be connection information between input ports and output ports of the reconfiguration switch. That is, the configuration controller may assign a PDU index of each PDU to a detection target preamble index of each FDO of the plurality of FDOs based on the reconfiguration information, and may set a detection target preamble-PDU matching index to distinguish the matching relationship between the detection target preamble index of each FDO and the PDU index assigned thereto. In addition, the configuration controller may generate the detection target preamble-PDU matching index information configured in form of {FDO index, detection target preamble index, detection target preamble-PDU index}. In addition, the configuration controller may generate deactivation information including PDU indexes for unused PDU ports.

Then, the configuration controller may transmit the detection target preamble-PDU matching index information, which is connection information between input ports and output ports, to the reconfiguration switch. Then, the reconfiguration switch may receive the detection target preamble-PDU matching index information, which is connection information between input ports and output ports, from the configuration controller. Accordingly, the reconfiguration switch may activate connection paths between input ports and output ports corresponding to the input ports using the detection target preamble-PDU matching index information, which is connection information between input ports and output ports. Through the above-described process, the reconfiguration switch may provide a reference sequence corresponding to each PDU based on the preamble-PDU matching index information (S1404). Then, each PDU may receive the reference sequence corresponding to the detection target preamble from the reference sequence generator through the reconfiguration switch.

Meanwhile, each of the PDUs may detect the corresponding preamble from the FFT data by using the reference sequence corresponding to the matched detection target preamble index (S1405).

Meanwhile, the data combiner may manage the output results for each FDO, which are operation results of the PDUs assigned to each FDO, and deliver them to the outside. For output management for each FDO, the data combiner may identify and store the outputs for each FDO, and output the outputs for each FDO, based on the reconfiguration information provided by the interconnection controller, which is the same as what the RIM receives (S1406).

Meanwhile, the DC may manage operation results of the respective PDUs assigned to each FDO as output results for each FDO, and deliver them to the outside. For output management for each FDO, the DC may classify and store the outputs for each FDO based on the reconfiguration information provided by the IC, which is the same as what the RIM receives.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a communication node, comprising:
assigning preambles to a plurality of frequency domain occasions (FDOs), respectively;
generating reconfiguration information including information on the preambles assigned to each of the plurality of FDOs;
assigning a physical random access channel (PRACH) detection unit (PDU) to each preamble among the assigned preambles based on the reconfiguration information;

generating a reference sequence for each of the assigned preambles based on information on the preambles assigned to each of the plurality of FDOs;

generating matching information between each preamble index of the preambles assigned to each of the plurality of FDOs and a PDU index of a PDU assigned to each preamble corresponding to each preamble index, based on the reconfiguration information; and detecting a preamble assigned to each PDU from a fast Fourier transform (FFT) signal using the reference sequence and each PDU according to the matching information, wherein the reconfiguration information includes an FDO index for each FDO of the plurality of FDOs and preamble indexes of the preambles assigned to the each FDO.

2. The method according to claim 1, wherein the generating of the reference sequence comprises:

obtaining, from a distributed unit, radio resource control (RRC) parameters including information on the preambles assigned to each FDO; and generating the reference sequence for each of the assigned preambles based on the RRC parameters obtained from the DU.

3. The method according to claim 1, further comprising:

generating reference sequence information including an FDO index for each FDO, a preamble index of each preamble of the assigned preambles, and the reference sequence for each preamble.

4. The method according to claim 1, wherein the generating of the matching information comprises:

identifying each preamble index of the preambles assigned to each FDO based on the reconfiguration information;

identifying the PDU index of the PDU assigned to each preamble; and based on a result of identifying the each preamble index and the PDU index, generating matching information including an FDO index for each FDO, the each preamble index, and the PDU index of the PDU assigned to the each preamble.

5. The method according to claim 1, further comprising: receiving preambles selected from among preambles received from the terminals by using the reference sequences assigned to the PDU based on the reconfiguration information through the plurality of FDOs, wherein the FFT signal includes the preambles received through the plurality of FDOs.

6. A communication node comprising:

a processor;

an interconnection controller;

a reference sequence generator;

a reconfiguration interconnection module; and physical random access channel (PRACH) detection units (PDUs), wherein the processor causes the communication node to perform:

assigning preambles to a plurality of frequency domain occasions (FDOs), respectively;

generating reconfiguration information including information on the preambles assigned to each of the plurality of FDOs;

assigning a physical random access channel (PRACH) detection unit (PDU) to each preamble among the assigned preambles based on the reconfiguration information;

generating a reference sequence for each of the assigned preambles based on information on the preambles assigned to each of the plurality of FDOs;

generating matching information between each preamble index of the preambles assigned to each of the plurality of FDOs and a PDU index of a PDU assigned to each preamble corresponding to each preamble index, based on the reconfiguration information; and detecting a preamble assigned to each PDU from a fast Fourier transform (FFT) signal using the reference sequence and each PDU according to the matching information, wherein the reconfiguration information includes an FDO index for each FDO of the plurality of FDOs and preamble indexes of the preambles assigned to the each FDO.

7. The communication node according to claim 6, wherein in the generating of the reference sequence, the processor further causes the communication node to perform:

obtaining, from a distributed unit, radio resource control (RRC) parameters including information on the preambles assigned to each FDO; and generating the reference sequence for each of the assigned preambles based on the RRC parameters obtained from the DU.

8. The communication node according to claim 6, wherein the processor further causes the communication node to perform: generating reference sequence information including an FDO index for each FDO, a preamble index of each preamble of the assigned preambles, and the reference sequence for each preamble.

9. The communication node according to claim 6, wherein in the generating of the matching information, the processor further causes the communication node to perform:

identifying each preamble index of the preambles assigned to each FDO based on the reconfiguration information;

identifying the PDU index of the PDU assigned to each preamble; and based on a result of identifying the each preamble index and the PDU index, generating matching information including an FDO index for each FDO, the each preamble index, and the PDU index of the PDU assigned to the each preamble.

10. The communication node according to claim 6, wherein the processor further causes the communication node to perform: receiving preambles selected from among preambles received from the terminals by using the reference sequences assigned to the PDU based on the reconfiguration information through the plurality of FDOs, wherein the FFT signal includes the preambles received through the plurality of FDOs.

* * * * *